March 19, 1946.   A. L. MARKER ET AL   2,397,026
QUICK CHANGE DRILL CHUCK
Filed May 23, 1944
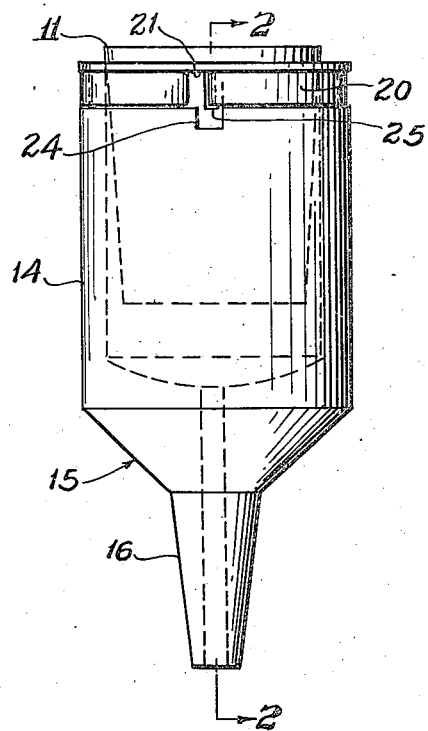
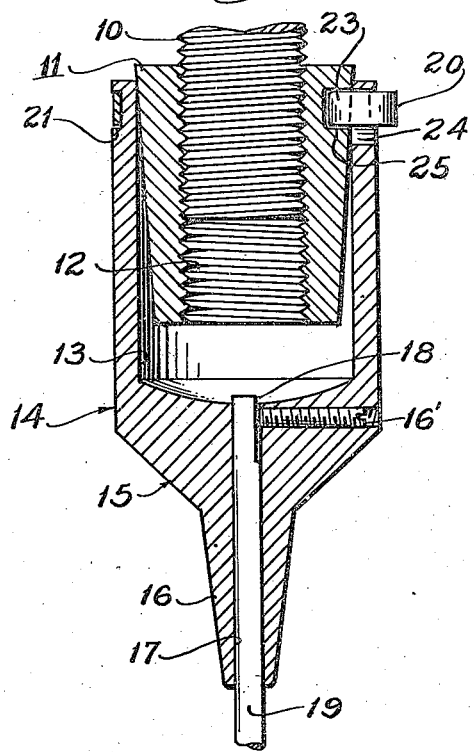
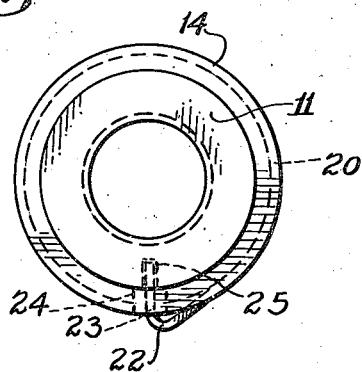
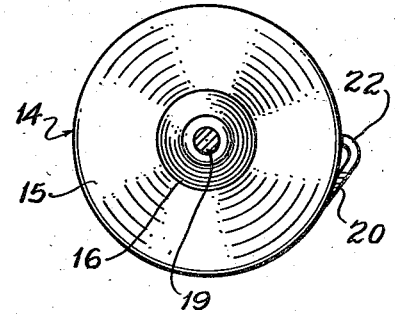
ALBERT L. MARKER
and EMRIC W. BERGERE
INVENTORS.
BY *James M. Abbott*
ATTORNEY.

Patented Mar. 19, 1946

2,397,026

UNITED STATES PATENT OFFICE 2,397,026

QUICK CHANGE DRILL CHUCK

Albert L. Marker and Emric W. Bergere,
San Diego, Calif.

Application May 23, 1944, Serial No. 536,998

1 Claim. (Cl. 279—79)

This invention relates to drilling machinery and particularly pertains to a quick change drill chuck.

In present production operations it is necessary for machine tools to work at high speed and this is particularly true in connection with the drilling of holes in metal by a drill press or a portable drill. At present a great many drilling operations are performed by workmen who have had little previous experience in drilling, and particularly in the handling of portable drill equipment, with the result that the drill bits are often broken. The usual construction of a drill bit mounting includes a chuck which has an operating screw adapted to be turned by a removable set key so that the shank of a drill bit may be fastened in the chuck or removed therefrom. This makes it possible for a broken drill bit to be removed and to be sharpened by a workman in the shop. It often happens that the workman is not skilled in sharpening bits and does not get the bit sharp or form the proper angle at the cutting point, with the result that drilling operations are performed inefficiently and a great deal of time is wasted. It is desirable to provide a chuck for drill bits which will be inexpensive and simple in construction, and which may be easily mounted upon a drill bit in a semi-permanent manner, so that the chuck and bit may be assembled and may thereafter be quickly and easily attached to the arbor of a drill press or portable drill. It is the principal object of the present invention, therefore, to provide a chuck having means whereby it may be instantly mounted upon or removed from the driving arbor of a drill structure, said chuck being designed to receive a drill bit and hold it so that the chuck and drill bit will be temporarily assembled as a unit.

The present invention contemplates the provision of an arbor attachment upon the driving spindle of a drill structure, said arbor being designed to detachably receive a chuck which positively rotates therewith, and which chuck has mounted therein a drill bit.

The invention is illustrated by way of example in the accompanying drawing in which:

Figure 1 is an enlarged view in side elevation showing the chuck with which the present invention is concerned and indicating by dotted lines its mounting upon a driving arbor.

Fig. 2 is a view in central vertical section through the chuck structure as seen on the line 2—2 of Fig. 1, and further shows a fragmentary portion of the shank of a drill bit mounted in the chuck.

Fig. 3 is a view in plan showing the top of the chuck structure with the arbor in place but with the driving spindle removed to show the detachable connection between the chuck and the arbor.

Fig. 4 is a view in plan showing the lower end of the chuck.

Referring more particularly to the drawing, 10 indicates a driving spindle of a drill press or a portable drill. This spindle is threaded and receives an arbor 11. The arbor is constructed of a suitable grade of steel and has a central threaded bore 12 therethrough. This bore receives the threaded end of the spindle 10. The outer surface of the arbor is frusto-conical so that it may be wedged into the cylindrical bore 13 of the chuck 14. The portion of the chuck within which the cylindrical bore occurs is cylindrical and has an inwardly converging conical surface 15, at the lower end of which a drill socket 16 is formed. The drill socket has an outer tapered surface and has a cylindrical bore 17 extending longitudinally and centrally thereof. Extending through the wall of the socket portion 16 is a pin 16'. This pin engages the flat portion 18 of a drill bit shank 19. The pin tends to hold the shank in position and also to prevent its rotation. The arbor 11 and the chuck 14 are temporarily locked together by a lock spring 20 which circumscribes the chuck and lies within a groove 21 formed in the outer surface of the cylindrical body of the chuck near its upper end. The lock spring 20, as shown in Fig. 3, has a looped portion 22 extending outwardly and being re-curved to terminate in a radially projecting tang 23. The tang 23 projects through a slot 24 formed through the cylindrical wall of the chuck 14. It also projects into a recess 25 formed in the side of the arbor. It will thus be seen that by this arrangement the tang 23 will act to lock the chuck on the arbor, and will also provide a positive driving connection between the chuck and the arbor so that they will rotate in unison.

In operation of the present invention an arbor is designed to fit the threaded spindle 10 of a piece of drilling equipment. The chuck is prepared for mounting on the arbor. This is done after first fastening the shank 19 of a drill bit within the socket bore by the pin 16'. The arbor 11 may then be screwed onto the driving spindle 10, after which the chuck may be slipped onto the arbor and locked by introducing the tang 23 into the recess 25 in the arbor. In the event the drill bit should become broken or dull the lock spring 20 may be easily flexed by engagement of the loop portion 22 so that the tang 23 will be retracted and allow the chuck to be instantly removed and replaced by another chuck carrying a drill bit. By this arrangement it is not necessary to have any lock key for manipulating the chuck, and it is also insured that the drill bit will not be ground immediately and re-used.

It will thus be seen that by the use of this structure drill bits may be replaced or bits of different sizes easily interchanged, since the arbor and chuck would remain the same, and different chucks would be equipped with drill bits of different diameters. It will be further evident that the structure here disclosed insures efficient operation of machines without loss of labor and in a manner to encourage the use of properly dressed tools.

While we have shown the preferred form of our invention as now known to us, it will be understood that various changes may be made in combination, construction and arrangement of parts by those skilled in the art, without departing from the spirit of the invention as claimed.

Having thus described our invention, what we claim and desire to secure by Letters Patent is:

A drill holding device, comprising an arbor having a central threaded opening to receive a drill spindle and having a frusto-conical outer wall, a chuck element having an upper cylindrical portion formed with a central cylindrical opening in its end to receive the arbor, the diameter of the cylindrical opening being greater than the diameter of the base of the arbor, whereby the chuck will fit onto the arbor with a tight fit, a tapered drill receiving portion formed at the opposite end of the chuck and having an opening centrally thereof to receive the shank of a drill bit, means within said opening to prevent rotation of the bit relative to the chuck, lock grooves, one formed in the wall of the cylindrical portion of the chuck and the other formed in the wall of the arbor, circumferentially extending grooves formed in the outer cylindrical surface of the chuck in the area of the transverse groove, a spring ring seated within said cylindrical groove and being formed with an inturned tang extending into the openings in the wall of the chuck and in the outer face of the arbor, whereby the chuck and arbor will be temporarily held against relative rotation.

ALBERT L. MARKER.
EMRIC W. BERGERE.